(12) United States Patent
Omori (10) Patent No.: US 9,084,164 B2
(45) Date of Patent: Jul. 14, 2015

(54) WIRELESS LAN SYSTEM, WIRELESS LAN ACCESS POINT, HANDOVER EXECUTION METHOD AND PROGRAM

(75) Inventor: Youko Omori, Tokyo (JP)

(73) Assignee: NEC CORPORATION, Tokyo (JP)

( * ) Notice: Subject to any disclaimer, the term of this patent is extended or adjusted under 35 U.S.C. 154(b) by 513 days.

(21) Appl. No.: 13/258,876

(22) PCT Filed: Mar. 26, 2010

(86) PCT No.: PCT/JP2010/055381
§ 371 (c)(1),
(2), (4) Date: Nov. 11, 2011

(87) PCT Pub. No.: WO2010/110426
PCT Pub. Date: Sep. 30, 2010

(65) Prior Publication Data
US 2012/0120916 A1    May 17, 2012

(30) Foreign Application Priority Data
Mar. 27, 2009   (JP) .................................. 2009-080035

(51) Int. Cl.
*H04W 36/08* (2009.01)
*H04W 36/00* (2009.01)
*H04W 52/02* (2009.01)
*H04W 88/08* (2009.01)
(Continued)

(52) U.S. Cl.
CPC .......... *H04W 36/08* (2013.01); *H04W 36/0033* (2013.01); *H04W 52/0245* (2013.01); *H04W 8/005* (2013.01); *H04W 48/08* (2013.01); *H04W 84/12* (2013.01); *H04W 88/08* (2013.01)

(58) Field of Classification Search
CPC .. H04W 36/08; H04W 52/0245; H04W 88/08
USPC ........................... 370/331–338; 455/436–439
See application file for complete search history.

(56) References Cited

U.S. PATENT DOCUMENTS

2005/0047374 A1* 3/2005 Rajkotia et al. ............... 370/332
2006/0239230 A1* 10/2006 Nakano ......................... 370/331
(Continued)

FOREIGN PATENT DOCUMENTS

| JP | 2003174456 A | 6/2003 |
| JP | 2004166277 A | 6/2004 |

OTHER PUBLICATIONS

International Search Report for PCT/55381 mailed Jul. 6, 2010.
(Continued)

*Primary Examiner* — Xavier Szewai Wong
(74) *Attorney, Agent, or Firm* — Sughrue Mion, PLLC (57) ABSTRACT

Disclosed is a wireless LAN access point which has a detection means for detecting another wireless LAN access point; a handover timing adjustment means which makes a wireless LAN client under the control of the local wireless LAN access point transmit the handover information required to accommodate the other wireless LAN access point and adjust the handover timing with the other wireless LAN access point when it is judged whether or not a handover to the other wireless access point of the wireless LAN client under control can be executed and the handover is executed based on information relating to the other wireless LAN access point detected; and handover execution means for stopping the communication to the wireless LAN client at the adjusted timing.

23 Claims, 5 Drawing Sheets

(51) Int. Cl.
    *H04W 8/00*      (2009.01)
    *H04W 48/08*     (2009.01)
    *H04W 84/12*     (2009.01)

(56) References Cited

U.S. PATENT DOCUMENTS

| | | | | |
|---|---|---|---|---|
| 2007/0243892 | A1* | 10/2007 | Mikami et al. | 455/507 |
| 2007/0258407 | A1* | 11/2007 | Li et al. | 370/331 |
| 2008/0125127 | A1* | 5/2008 | Hwang | 455/436 |
| 2009/0104909 | A1* | 4/2009 | Vesely et al. | 455/436 |
| 2009/0219888 | A1* | 9/2009 | Chen et al. | 370/331 |
| 2011/0075633 | A1* | 3/2011 | Johansson et al. | 370/331 |

OTHER PUBLICATIONS

IEEE802.11r, IEEE Standard for Information technology—Telecommunication and information exchange between systems—Local and metropolitan area networks—Specific requirements, Part 11: Wireless LAN Medium Access Control (MAC) and Physical Layer (PHY) Specifications, Amendment 2: Fast Basic Service Set (BSS) Transition Jul. 15, 2008.

IEEE802.11, Part 11: Wireless LAN Medium Access Control (MAC) and Physical Layer (PHY) Specifications, Jun. 12, 2007.

* cited by examiner

WIRELESS LAN SYSTEM, WIRELESS LAN ACCESS POINT, HANDOVER EXECUTION METHOD AND PROGRAM

TECHNICAL FIELD

The present invention relates to a wireless LAN system, a wireless LAN access point, a handover execution method, a program therefor.

BACKGROUND ART

While the wireless LAN in conformity to IEEE802.11 is mounted onto personal computers in the beginning, and widens its utilization scene as Internet prevails, it prevails recently also as a means of Internet access such as games and cameras. In the meantime, the location in which the wireless LAN can be used is limited to the locations in which the wireless LAN access points have been installed, for example, a home and a public wireless LAN spot. Thus, the wireless LAN has a problem with respect to a freedom degree of mobility as compared with a service by a wide wireless access net such as a mobile telephone service.

As one suggestion for solving such mobility of the wireless LAN, there exists a movement for enlarging a utilization area of various devices each having a wireless LAN client function by enhancing the mobility of the wireless LAN access point, which is yielded by combining then. appliances having a function of an access to the wide wireless system, and a wireless LAN access point function. For example, by allowing the mobile telephone to have the wireless LAN access point function, the mobile wireless LAN access point is realized, and the various wireless LAN appliances can utilize such a service that enables the access to Internet.

However, in a case where the wireless LAN access point functions as the mobile wireless LAN access point, a switchover is desirably made from the mobile wireless LAN access point to the fixed wireless LAN access point within a service area of the fixed wireless LAN access points such as the home and the public wireless LAN spot from a viewpoint of bands of use lines of the mobile wireless LAN access points, power saving of the appliance (for example, the mobile telephone) that functions as the wireless LAN access point, and the like.

CITATION LIST

Non-Patent Literature

NPL 1: IEEE802.11-2007
NPL 2: IEEE802.11r

SUMMARY OF INVENTION

Technical Problem

By the way, protocol for the switchover between the wireless LAN access points, namely, handover is prepared in IEEE 802.11. Further, protocol for realizing high-speed handover during communication is also standardized.

However, in any case, the wireless LAN client performs the search for the wireless LAN access point in some cases, and performs the signaling for the switchover in some cases, thereby to perform the handover to the new access point.

In the wireless LAN of IEEE 802.11, the access point cannot forcibly perform the handover of the wireless LAN clients under control thereof to the other access points, and the handover is performed under the leadership of the wireless LAN client.

However, algorithm and timing of the above handover mostly depend upon the mounting of individual wireless LAN clients, and all of the wireless LAN client appliances that are making communication with the mobile wireless LAN access points perform the handover according to respective mountings in a case where various appliances are accommodated, whereby all of them do not always perform the handover likewise, and the situation in which the handover function is not mounted in the beginning is also fully thinkable.

Thereupon, the present invention has been accomplished in consideration of the above-mentioned problems, and an object thereof is to provide the wireless LAN system for realizing the handover under the leadership of the wireless LAN access point, the wireless LAN access point, the handover execution method and the program therefor.

Solution to Problem

The present invention for solving the above-mentioned problems is a wireless LAN system comprising a first wireless LAN access point and a second wireless LAN access point: wherein said first wireless LAN access point comprises: a detection means that detects said second wireless LAN access point; a handover timing adjustment means that judges whether or not a handover of wireless LAN clients under control to said second wireless LAN access point can be executed based upon information relating to said detected second wireless LAN access point, transmits handover information necessary for accommodation of said wireless LAN clients under control of said first wireless LAN access point, said accommodation being performed by said second wireless LAN access point, and adjusts timing of the handover with said second wireless LAN access point when the handover is executed; and a handover execution means that stops communication to said wireless LAN clients at said adjusted timing; and wherein said second wireless LAN access point comprises: a handover timing adjustment means that makes a response to a request for the handover coming from said first wireless LAN access point, judges whether or not said handover can be executed, and adjusts timing of the handover with said first wireless LAN access point when the handover is executed; and a handover execution means that starts communication to said wireless LAN clients at the timing in which said handover is executed based upon said handover information.

The present invention for solving the above-mentioned problems is a wireless LAN access point comprising: a detection means that detects the other wireless LAN access points; a handover timing adjustment means that judges whether or not a handover of wireless LAN clients under control to said other wireless access points can be executed based upon information relating to said detected other wireless LAN access points, transmits handover information necessary for accommodation of the wireless LAN clients under control of its own wireless LAN access point, said accommodation being performed by said other wireless LAN access points, and adjusts timing of the handover with said other wireless LAN access points when the handover is executed; and a handover execution means that stops communication to said wireless LAN clients at said adjusted timing.

The present invention for solving the above-mentioned problems is a wireless LAN access point comprising: a handover timing adjustment means that makes a response to a request for handover coming from the other wireless LAN access points, judges whether or not said handover can be executed, and adjusts timing of the handover with said other wireless LAN access points when the handover is executed; and a handover execution means that receives handover information necessary for accommodating the wireless LAN clients under control of said other wireless LAN access points from said other wireless LAN access points, and starts communication to said wireless LAN clients at said adjusted timing of the handover based upon said handover information.

The present invention for solving the above-mentioned problems is a handover execution method: wherein a first wireless LAN access point detects a second wireless LAN access point; wherein said first wireless LAN access point: judges whether or not a handover of wireless LAN clients under control thereof to said second wireless access point can be executed based upon information relating to said detected second wireless LAN access point; transmits handover information necessary for accommodation of said wireless LAN clients under control of said first wireless LAN access point, said accommodation being performed by said second wireless LAN access point, and adjusts timing of the handover with said second wireless LAN access point when the handover is executed; and stops communication to said wireless LAN clients at said adjusted timing; and wherein said second wireless LAN access point: makes a response to a request for the handover coming from said first wireless LAN access point, and judges whether or not said handover can be executed; adjusts the timing of the handover with said first wireless LAN access point when the handover is executed; and starts communication to said wireless LAN clients at the timing in which said handover is executed based upon said handover information.

The present invention for solving the above-mentioned problems is a program for causing an information processing device to execute: a detection process of detecting the other wireless LAN access points; a handover timing adjustment process of judging whether or not a handover of wireless LAN clients under control to said other wireless LAN access points can be executed based upon information relating to said detected other wireless LAN access points, transmitting handover information necessary for accommodation of the wireless LAN clients under control of its own wireless LAN access point, said accommodation being performed by said other wireless LAN access points, and adjusting timing of the handover with said other wireless LAN access points when the handover is executed; and a handover execution process of stopping communication to said wireless LAN clients at said adjusted timing.

The present invention for solving the above-mentioned problems is a program for causing an information processing device to execute: a handover timing adjustment process of making a response to a request for handover coming from the other wireless LAN access points, judging whether or not said handover can be executed, and adjusting timing of the handover with said other wireless LAN access points when the handover is executed; and a handover execution process of receiving handover information necessary for accommodating the wireless LAN clients under control of said other wireless LAN access points from said other wireless LAN access points, and starting communication to said wireless LAN clients at said adjusted timing of the handover based upon said handover information.

ADVANTAGEOUS EFFECT OF INVENTION

The present invention makes it possible to realize the handover under the leadership of the wireless LAN access point.

DESCRIPTION OF EMBODIMENTS

The exemplary embodiments of the present invention will be explained.

(First Exemplary Embodiment)

The first exemplary embodiment of the present invention will be explained.

Figure 1:
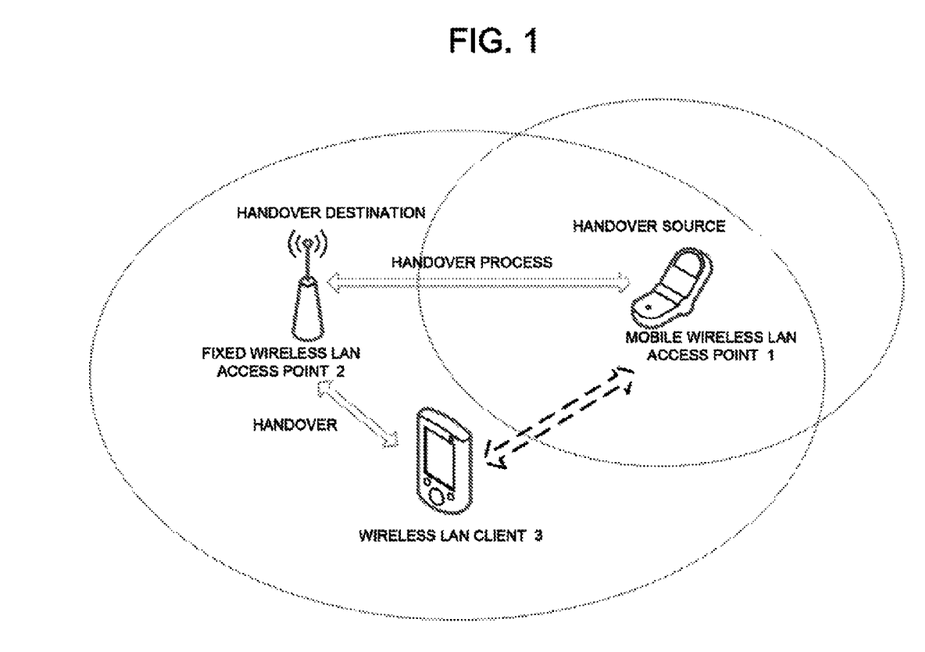
FIG. 1 is a system schematic view of a first exemplary embodiment.

FIG. 1 is a system schematic view of the first exemplary embodiment.

In FIG. 1, 1 is a mobile wireless LAN access point obtained by mounting a wireless LAN access point function onto a mobile telephone etc., 2 is a fixed wireless LAN access point, and 3 is a wireless LAN client.

In the first exemplary embodiment, an example in which the wireless LAN client 3 is connected to the mobile wireless LAN access point 1, the handover process is performed between the mobile wireless LAN access point 1 and the wireless LAN access point 2 thereafter, and the wireless LAN client 3 is handovered to the wireless LAN access point 2 will be explained.

Figure 2:
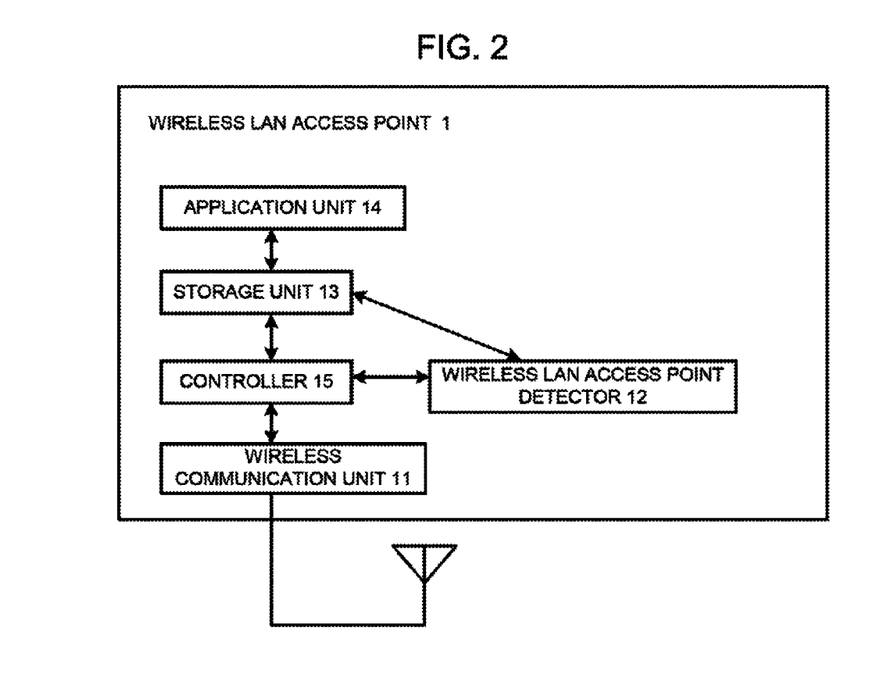
FIG. 2 is a block diagram of the wireless LAN access point in the first exemplary embodiment.

FIG. 2 is a block diagram of the wireless LAN access point in the first exemplary embodiment. Additionally, each of the mobile wireless LAN access point 1 and the fixed wireless LAN access point 2 has a basically similar configuration.

This mobile wireless LAN access point 1 includes a wireless communication unit 11, a wireless LAN access point detector 12, a storage unit 13, an application unit 14, and a controller 15.

The wireless communication unit 11 has a function of making communication with the other fixed wireless LAN access points 2 and the wireless LAN clients 3 by employing a radio communication. The communication with other wireless LAN access points 2 is made by employing the wireless techniques such as the wireless LAN (IEEE802.11), 3G, GSM, WiMAX. Further, the communication may be made by employing a wired communication (via Internet etc. connected by the wired system). The communication with wireless LAN client 3 is made by employing the wireless LAN (IEEE802.11).

The wireless LAN access point detector 12 has a function of detecting other wireless LAN access points 2 based upon information coming from the wireless communication unit 11, and information previously stored in the storage unit 13.

The storage unit 13 stores information relating to other wireless LAN access points 2. This information is information announced mainly with Beacon Management Frame. This information is, for example, ESSID, MAC, Address (BBSID) and a TSF value of the other wireless LAN access points 2, a DTIM interval timing, setting information of security, a management table of terminals to be stored within the access point, and the like.

In the aforementioned information, downlink transmission frames buffered in the access point at a switching timing of the handover are also included. It is also possible for the application unit 14 to previously set and store storable information, for example, information of ESSID etc. out of these items of the information. The aforementioned information is given from the wireless communication unit 11, the storage unit 13, and/or the application unit 14.

The application unit 14 has a function of performing the preparatory setting of information to the storage unit 13, or the like.

The controller 15 has a function of adjusting the timing of the handover with the other wireless LAN access points 2 based upon the information stored in the storage unit 13.

Further, the controller 15 has a function of controlling an operation of the wireless LAN access point at the aforementioned adjusted timing. That is, the wireless LAN access point 1, being a handover source, stops the Beacon Management Frame at the pre-decided timing, and quickly transmits the buffered data to the wireless LAN access point 2, being a handover destination.

The wireless LAN access point 2, being a handover destination, starts to transmit the Beacon Management Frame at the pre-decided timing, and allows the communication with the wireless LAN client 3 to be continued. At this time, accurately undertaking not only the information such as ESSID but also the timer values such as a TSF value and DTIM allows the function as well linked to the timer of the access point, for example, a power-saving operation to be succeeded seamlessly. That is, in the view of the wireless LAN client 3, the handover is realized in such a manner that the wireless LAN client 3 is not aware of the switchover of the access point.

Next, an operation of the first exemplary embodiment will be explained in details.

Figure 3:
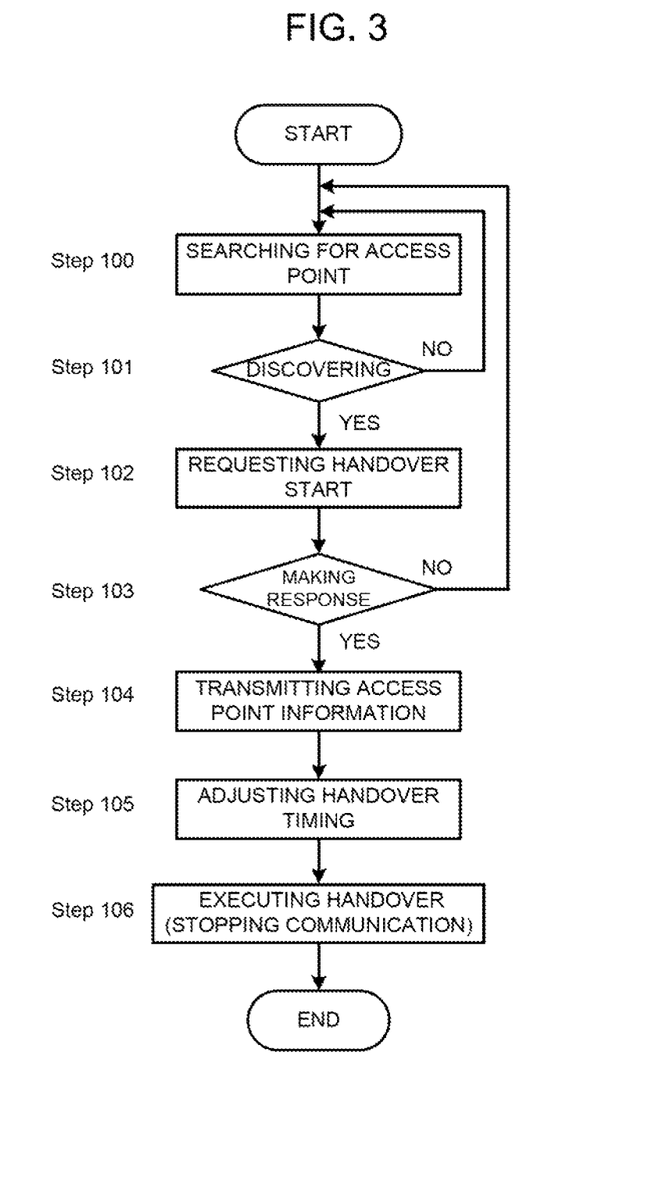
FIG. 3 is an operational flowchart of a mobile wireless LAN access point 1, being a handover source.
Figure 4:
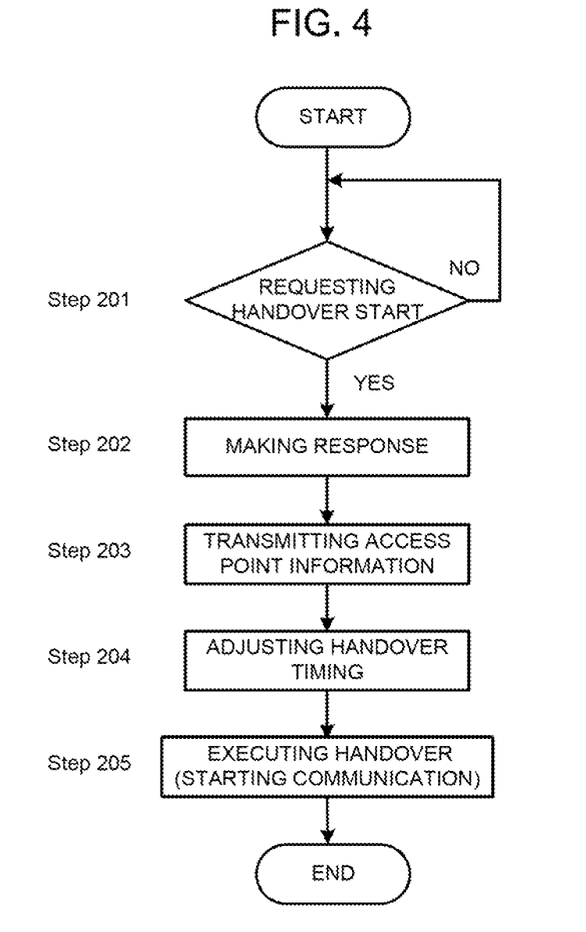
FIG. 4 is an operational flowchart of a wireless LAN access point 2, being a handover destination.

FIG. 3 is an operational flowchart of the mobile wireless LAN access point 1, being a handover source, and FIG. 4 is an operational flowchart of the wireless LAN access point 2, being a handover destination.

At first, the mobile wireless LAN access point 1, being a handover source, searches for (retrieves) the other wireless LAN access points to which the wireless LAN clients 3 under control thereof are handovered (Step 100).

When the mobile wireless LAN access point 1, being a handover source, judges that the retrieved wireless LAN access point is an appropriate access point as a handover destination by making a collation with the pre-set information of the storage unit 13, for example, information such as ESSID and security setting (Step 101), it requests of the wireless LAN access point, being a handover destination, the handover start (Step 102). Additionally, this search and request may be made under the leadership of the wireless LAN access point 2, being a handover destination.

When the mobile wireless LAN access point 1, being a handover source, receives a response to the handover start from the wireless LAN access point 2, being a handover destination (Step 103), it continuously transmits information of its own station (Step 104). This information is information necessary for the accommodation of the wireless LAN clients 3 under control that the access point, being a handover destination, performs instead of the mobile wireless LAN access point 1, and includes information to be announced with the Beacon Management Frame, the timer value, a table of the wireless LAN clients 3 under control, information buffered for transmission to these wireless LAN clients, and the like.

The mobile wireless LAN access point 1, being a handover source, decides and notifies the timing of the handover when these items of the information have been transmitted, or while transmitting the information (Step 105). Herein, when the timing is designated by the access point, being a handover destination, the wireless LAN access point, being a handover source, makes a collation with a communication situation of its own station, judges that the above designated timing is a handover timing in a case where no problem exists, and designates another timing in a case where the designated timing is judged to be unsuitable from the situation of traffic of communication and electric field strength, Finally, the mobile wireless LAN access point 1, being a handover source, stops the communication including the Beacon Management Frame according to the adjusted timing, thereby to perform the handover (Step 106).

Next, an operation of the wireless LAN access point 2, being a handover destination, will be explained.

At first, upon receipt of a request for staring the handover from the mobile wireless LAN access point 1, being a handover source (Step 200), the wireless LAN access point 2, being a handover destination, makes a collation with the pre-set information of the storage unit 13, for example, information such as ESSID and security setting, and makes a response to the handover start when it judges that the above access point is a suitable access point as a handover source (Step 201).

And, the wireless LAN access point 2, being a handover destination, receives the information of the mobile wireless LAN access point 1, being a handover source, and stores it in the storage unit 13 (Step 202). The wireless LAN access point 2, being a handover destination, decides the timing of the handover when these items of the information have been received, or while receiving them (Step 203). At this time, the wireless LAN access point 2, being a handover destination, judges whether the handover can be executed at the timing of the handover notified from the mobile wireless LAN access point 1, being a handover source, by making a collation with the communication situation of the station, decides that the designated timing is a handover timing in a case where no problem exists, and notifies the effect that the handover is impossible, or the different timing in a case where the designated timing is judged to be unsuitable from the situation of traffic of communication and electric field strength.

When the handover can be executed at the notified timing, the wireless LAN access point 2, being a handover destination, starts the communication including the Beacon Management Frame according to the above adjusted timing, thereby to perform the handover (Step 204).

In the first exemplary embodiment, as described above, the wireless LAN access point, being a handover source, and the wireless LAN access point, being a handover destination switch the communication of the Beacon Management Frame at the pre-decided timing, whereby it is recognized from the wireless LAN clients that the above communication is continuous communication, and the handover is realized in such a manner that the wireless LAN client 3 is not aware of the switchover of the access point.

Further, accurately undertaking the timer value as well makes it possible to realize the handover without disturbing the power saving operation of the wireless LAN clients under control.

Additionally, while an example of the handover from the mobile wireless LAN access point 1 to the wireless LAN access point 2 was explained in the above-described exemplary embodiment, the handover is not limited hereto, and the handover from the wireless LAN access point 2 to the mobile wireless LAN access point 1 can be also executed.

(Second Exemplary Embodiment)

The second exemplary embodiment of the present invention will be explained.

An example in which the wireless LAN access point, being a handover source, and the wireless LAN access point, being a handover destination switched the communication of the Beacon Management Frame at the pre-decided timing, whereby it was recognized from the wireless LAN clients that the above communication was continuous communication, and the handover was realized was explained in the above-described first exemplary embodiment.

However, there is the case in which the wireless LAN access point, being a handover source, and the wireless LAN access point, being a handover destination, make communication at a different frequency, respectively.

Thereupon, an example will be explained in which the wireless LAN access point, being a handover source, notifies a shift of the frequency to the wireless LAN clients under control thereof, thereby to perform the handover in a case where the wireless LAN access point, being a handover source, and the wireless LAN access point, being a handover destination, make communication at a different frequency, respectively.

The wireless LAN access point in the second exemplary embodiment, which has a configuration similar to that of the above-described first exemplary embodiment, differs in a point of notifying a change of a communication channel to the wireless LAN clients under control thereof. The communication channel (frequency) to be used in the wireless LAN access point, being a handover destination, may be previously stored in the storage unit 13 in some cases, and may be acquired at the-time of adjusting the timing with the wireless LAN access point, being a handover destination, in some cases.

Figure 5:
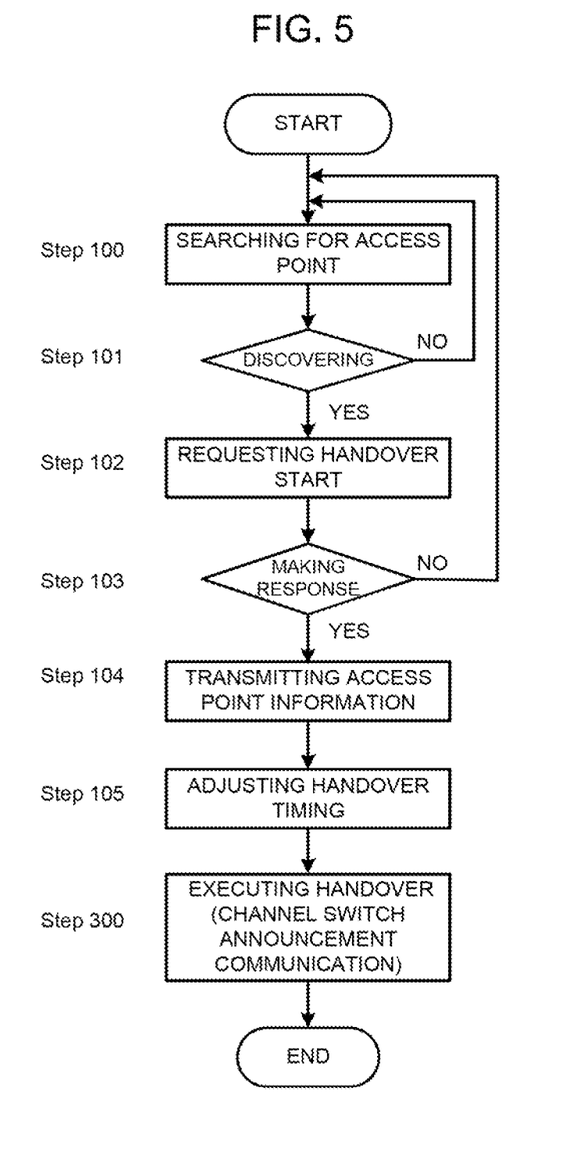
FIG. 5 is an operational flowchart of the mobile wireless LAN access point 1, being a handover source.
Figure 6:
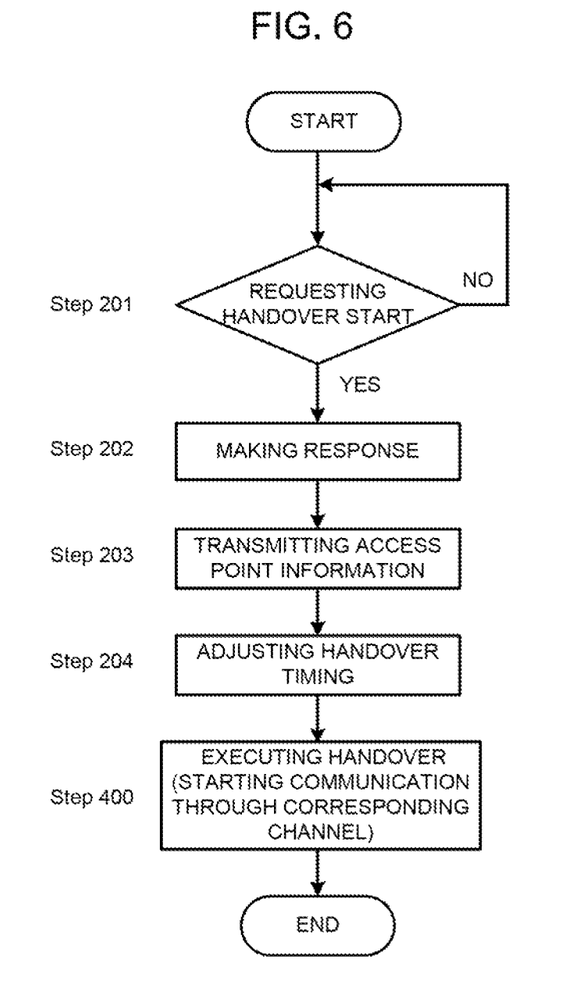
FIG. 6 is an operational flowchart of the wireless LAN access point 2, being a handover destination.

FIG. 5 is an operational flowchart of the mobile wireless LAN access point 1, being a handover source, and FIG. 6 is an operational flowchart of the wireless LAN access point 2, being a handover destination. Additionally, the explanation is made with a point in which the second exemplary embodiment differs from the first exemplary embodiment taken as a center, and codes identical to that of FIG. 3 and FIG. 4 are affixed to the similar operations.

At first, the mobile wireless LAN access point 1, being a handover source, transmits information of the search for the other wireless LAN access points to which the wireless LAN clients 3 under control thereof are handovered, the decision, the request for starting the handover, and its own station, and decides the timing of the handover (Steps 100 to 105).

Next, the mobile wireless LAN access point 1, being a handover source, transmits the Beacon Management Frame including Channel Switch Announcement element specified in 1EEE802.11 to the wireless LAN clients 3 under control thereof according to the adjusted timing, and executes a change of the communication channel of the wireless LAN client 3 (Step 300).

The wireless LAN access point 2, being a handover destination, starts the communication including the Beacon Management Frame at the adjusted timing through the corresponding channel (the channel designated in the Channel Switch Announcement element) on the basis of the adjusted timing, thereby to execute the handover (Step 400).

(Third Exemplary Embodiment)

In the above-described second exemplary embodiment, the access point, being a handover source, transmitted the Channel Switch Request to all of the wireless LAN clients under control thereof as broadcast. However, by transmitting the Channel Switch Request only to a specific terminal by employing the Channel Switch Announcement frame as a unicast frame, it is also possible to designate the terminal that is handovered.

This is useful in the case of handovering only one part of the wireless LAN clients during the communication through its own house's access point to the mobile wireless LAN access point utilizing the mobile telephone, and going out.

As described above, with the above-mentioned technologies of the exemplary embodiments, the handover by the wireless LAN access point is realized. That is, the handover under the leadership of the wireless LAN access point is realized. By adjusting the timing and the communication channel between the wireless LAN access points, and stopping/starting the communication, the handover is realized without causing the wireless LAN clients to execute the switching procedure of the access point. Accurately undertaking the timer value as well at the moment of the handover enables the power saving of the wireless LAN clients under control to be realized.

Additionally, while each unit of the wireless LAN access point was configured with hardware in the above-described exemplary embodiments, the entirety or one part thereof can be also configured with an information processing device that operates under a program.

Further, the content of the above-mentioned exemplary embodiments can be expressed as follows.

(Supplementary note 1) A wireless LAN system comprising a first wireless LAN access point and a second wireless LAN access point:
  wherein said first wireless LAN access point comprises:
  a detection means that detects said second wireless LAN access point;
  a handover timing adjustment means that judges whether or not a handover of wireless LAN clients under control to said second wireless LAN access point can be executed based upon information relating to said detected second wireless LAN access point, transmits handover information necessary for accommodation of said wireless LAN clients under control of said first wireless LAN access point, said accommodation being performed by said second wireless LAN access point, and adjusts timing of the handover with said second wireless LAN access point when the handover is executed; and
  a handover execution means that stops communication to said wireless LAN clients at said adjusted timing; and
  wherein said second wireless LAN access point comprises:
  a handover timing adjustment means that makes a response to a request for the handover coming from said first wireless LAN access point, judges whether or not said handover can be executed, and adjusts timing of the handover with said first wireless LAN access point when the handover is executed; and
  a handover execution means that starts communication to said wireless LAN clients at the timing in which said handover is executed based upon said handover information.

(Supplementary note 2) A wireless LAN system according to supplementary note 1, wherein said first wireless LAN access point comprises a storage unit that stores information relating to said second wireless LAN access point.

(Supplementary note 3) A wireless LAN system according to supplementary note 1 or supplementary note 2, wherein said handover execution means of the first wireless LAN access point and the second wireless LAN access point stop or start communication including Beacon Management Frame.

(Supplementary note 4) A wireless LAN system according to one of supplementary note 1 to supplementary note 3, wherein said handover information includes at least any of information to be announced with the Beacon Management Frame, a timer value, a table of the wireless LAN clients under control, and information buffered for transmission to said wireless LAN clients under control.

(Supplementary note 5) A wireless LAN system according to one of supplementary note 1 to supplementary note 4:

wherein said handover execution means of the first wireless LAN access point notifies a change of a communication channel to the wireless LAN clients under control; and wherein said handover execution means of the second wireless LAN access point starts the communication to said wireless LAN clients through said communication channel.

(Supplementary note 6) A wireless LAN system according to supplementary note 5, wherein said handover execution means of the first wireless LAN access point notifies a change of the communication channel only to a specific wireless LAN client.

(Supplementary note 7) A wireless LAN system according to supplementary note 5 or supplementary note 6, wherein said handover execution means of the first wireless LAN access point employs Channel Switch Announcement frame for changing the communication channel.

(Supplementary note 8) A wireless LAN access point comprising:

a detection means that detects the other wireless LAN access points;

a handover timing adjustment means that judges whether or not a handover of wireless LAN clients under control to said other wireless access points can be executed based upon information relating to said detected other wireless LAN access points, transmits handover information necessary for accommodation of the wireless LAN clients under control of its own wireless LAN access point, said accommodation being performed by said other wireless LAN access points, and adjusts timing of the handover with said other wireless LAN access points when the handover is executed; and a handover execution means that stops communication to said wireless LAN clients at said adjusted timing.

(Supplementary note 9) A wireless LAN access point according to supplementary note 8, comprising a storage unit that stores information relating to said other wireless LAN access points.

(Supplementary note 10) A wireless LAN access point according to supplementary note 8 or supplementary note 9, wherein said handover execution means stops communication including Beacon Management Frame.

(Supplementary note 11) A wireless LAN access point according to one of supplementary note 8 to supplementary note 10, wherein said handover information includes at least any of information to be announced with the Beacon Management Frame, a timer value, a table of the wireless LAN clients under control, and information buffered for transmission to said wireless LAN clients under control.

(Supplementary note 12) A wireless LAN access point according to one of supplementary note 8 to supplementary note 11, wherein said handover execution means notifies a change of a communication channel to the wireless LAN clients under control.

(Supplementary note 13) A wireless LAN access point according to supplementary note 12, wherein said handover execution means notifies a change of the communication channel only to a specific wireless LAN client.

(Supplementary note 14) A wireless LAN access point according to supplementary note 12 or supplementary note 13, wherein said handover execution means employs Channel Switch Announcement frame for changing the communication channel.

(Supplementary note 15) A wireless LAN access point comprising:

a handover timing adjustment means that makes a response to a request for handover coming from the other wireless LAN access points, judges whether or not said handover can be executed, and adjusts timing of the handover with said other wireless LAN access points when the handover is executed; and a handover execution means that receives handover information necessary for accommodating the wireless LAN clients under control of said other wireless LAN access points from said other wireless LAN access points, and starts communication to said wireless LAN clients at said adjusted timing of the handover based upon said handover information.

(Supplementary note 16) A wireless LAN access point according to supplementary note 15, wherein said handover execution means starts communication including Beacon Management Frame.

(Supplementary note 17) A wireless LAN access point according to supplementary note 15 or supplementary note 16, wherein said handover information includes at least any of information to be announced with the Beacon Management Frame, a timer value, a table of the wireless LAN clients under control, and information buffered for transmission to said wireless LAN clients under control.

(Supplementary note 18) A handover execution method:

wherein a first wireless LAN access point detects a second wireless LAN access point;

wherein said first wireless LAN access point:

judges whether or not a handover of wireless LAN clients under control thereof to said second wireless access point can be executed based upon information relating to said detected second wireless LAN access point;

transmits handover information necessary for accommodation of said wireless LAN clients under control of said first wireless LAN access point, said accommodation being performed by said second wireless LAN access point, and adjusts timing of the handover with said second wireless LAN access point when the handover is executed; and stops communication to said wireless LAN clients at said adjusted timing; and wherein said second wireless LAN access point:

makes a response to a request for the handover coming from said first wireless LAN access point, and judges whether or not said handover can be executed;

adjusts the timing of the handover with said first wireless LAN access point when the handover is executed; and starts communication to said wireless LAN clients at the timing in which said handover is executed based upon said handover information.

(Supplementary note 19) A handover execution method according to supplementary note 18, wherein said first wireless LAN access point and said second wireless LAN access point stop or start communication including Beacon Management Frame.

(Supplementary note 20) A handover execution method according to supplementary note 18 or supplementary note 19, wherein said handover information includes at least any of information to be announced with the Beacon Management Frame, a timer value, a table of the wireless LAN clients under control, and information buffered for transmission to said wireless LAN clients under control.

(Supplementary note 21) A handover execution method according to one of supplementary note 18 to supplementary note 20:

wherein said first wireless LAN access point notifies a change of a communication channel to the wireless LAN clients under control thereof; and wherein said second wireless LAN access point starts the communication to said wireless LAN clients through said communication channel.

(Supplementary note 22) A handover execution method according to supplementary note 21, wherein said first wireless LAN access point notifies a change of the communication channel only to a specific wireless LAN client.

(Supplementary note 23) A handover execution method according to supplementary note 21 or supplementary note 22, wherein said first wireless LAN access point employs Channel Switch Announcement frame for changing the communication channel.

(Supplementary note 24) A program for causing an information processing device to execute:

a detection process of detecting the other wireless LAN access points;

a handover timing adjustment process of judging whether or not a handover of wireless LAN clients under control to said other wireless LAN access points can be executed based upon information relating to said detected other wireless LAN access points, transmitting handover information necessary for accommodation of the wireless LAN clients under control of its own wireless LAN access point, said accommodation being performed by said other wireless LAN access points, and adjusting timing of the handover with said other wireless LAN access points when the handover is executed; and a handover execution process of stopping communication to said wireless LAN clients at said adjusted timing.

(Supplementary note 25) A program for causing an information processing device to execute:

a handover timing adjustment process of making a response to a request for handover coming from the other wireless LAN access points, judging whether or not said handover can be executed, and adjusting timing of the handover with said other wireless LAN access points when the handover is executed; and a handover execution process of receiving handover information necessary for accommodating the wireless LAN clients under control of said other wireless LAN access points from said other wireless LAN access points, and starting communication to said wireless LAN clients at said adjusted timing of the handover based upon said handover information.

(Supplementary note 26) A wireless LAN access point comprising:

a communication unit that can make communication with wireless LAN clients and/or other wireless LAN access points;

a wireless LAN access point detector that detects the other wireless LAN access points; and a controller that controls an operation of the wireless access point, said wireless LAN access point making an adjustment with the other wireless LAN access points and executing a handover.

(Supplementary note 27) A wireless LAN access point according to supplementary note 26, further comprising a storage unit that stores information relating to the other wireless LAN access points.

(Supplementary note 28) A wireless LAN access point according to supplementary note 26, wherein said controller communicates information of its own station including timer information to and from the other wireless LAN access points, and stops/starts communication to an adjusted time.

(Supplementary note 29) A wireless LAN access point according to supplementary note 26, wherein said controller changes communication channels of wireless LAN clients under control to an adjusted time and executes the handover.

(Supplementary note 30) A handover method under a leadership of wireless LAN access points, comprising:

a detection step of detecting other wireless LAN access points by the wireless LAN access point;

an adjustment step of adjusting a handover with the other wireless LAN access points detected by said detection step; and a step of changing communication channels of wireless LAN clients after said adjustment step, and executing the handover by the wireless LAN access point.

(Supplementary note 31) A handover method according to supplementary note 30, said handover method being executed by the wireless LAN access point of supplementary note 26.

Above, although the present invention has been particularly described with reference to the preferred embodiments, it should be readily apparent to those of ordinary skill in the art that the present invention is not always limited to the above-mentioned embodiment, and changes and modifications in the form and details may be made without departing from the spirit and scope of the invention.

This application is based upon and claims the benefit of priority from Japanese patent application No. 2009-080035, filed on Mar. 27, 2009, the disclosure of which is incorporated herein in its entirety by reference.

[Reference Signs List]

1 mobile wireless LAN access point
2 wireless LAN access point
3 wireless LAN client
11 wireless communication unit
12 wireless LAN access point detector
13 storage unit
14 controller

The invention claimed is:

1. A wireless LAN system comprising a first wireless LAN access point and a second wireless LAN access point:
wherein said first wireless LAN access point comprises:
a detector that detects said second wireless LAN access point independent of wireless LAN clients;
a handover timing adjuster that judges whether or not a handover of the wireless LAN clients under control to said second wireless LAN access point is to be executed independent of the wireless LAN clients based upon information relating to said detected second wireless LAN access point, transmits handover information necessary for accommodation of said wireless LAN clients under control of said first wireless LAN access point to said second wireless LAN access points independent of the wireless LAN clients, said accommodation being performed by said second wireless LAN access point, and adjusts timing of the handover with said second wireless LAN access point independent of the wireless LAN clients when the handover is executed, wherein said handover information includes a timer value of Delivery Traffic Indication Map (DTIM) of said first wireless LAN access point; and a handover execution unit that stops communication to said wireless LAN clients at said adjusted timing independent of the wireless LAN clients; and wherein said second wireless LAN access point comprises:

a handover timing adjuster that makes a response to a request for the handover coming from said first wireless LAN access point, judges whether or not said handover is to be executed independent of the wireless LAN clients, and adjusts timing of the handover with said first wireless LAN access point independent of the wireless LAN clients when the handover is executed; and a handover execution unit that starts communication to said wireless LAN clients at the timing in which said handover is executed based upon said handover information, wherein said first wireless LAN access point comprises a storage that stores information relating to said second wireless LAN access point, wherein said handover timing adjuster judges whether or not the handover of the wireless LAN clients under control to said second wireless LAN access points is to be executed by collating with the information relating to said second wireless LAN access points stored in said storage.

2. The wireless LAN system according to claim 1, wherein said handover execution unit of the first wireless LAN access point and the second wireless LAN access point stop or start communication including Beacon Management Frame.

3. The wireless LAN system according to claim 1, wherein said handover information includes at least one of a table of the wireless LAN clients under control, and information buffered for transmission to said wireless LAN clients under control.

4. The wireless LAN system according to claim 1:

wherein said handover execution unit of the first wireless LAN access point notifies a change of a communication channel to the wireless LAN clients under control; and wherein said handover execution unit of the second wireless LAN access point starts the communication to said wireless LAN clients through said communication channel.

5. The wireless LAN system according to claim 4, wherein said handover execution unit of the first wireless LAN access point notifies a change of the communication channel only to a specific wireless LAN client.

6. The wireless LAN system according to claim 4, wherein said handover execution unit of the first wireless LAN access point employs Channel Switch Announcement frame for changing the communication channel.

7. A wireless LAN access point comprising:

a detector that detects other wireless LAN access points independent of wireless LAN clients;

a handover timing adjuster that judges whether or not a handover of the wireless LAN clients under control to said other wireless access points is to be executed independent of the wireless LAN clients based upon information relating to said detected other wireless LAN access points, transmits handover information necessary for accommodation of the wireless LAN clients under control of its own wireless LAN access point to said other wireless LAN access points independent of the wireless LAN clients, said accommodation being performed by said other wireless LAN access points, and adjusts timing of the handover with said other wireless LAN access points independent of the wireless LAN clients when the handover is executed, wherein said handover information includes a timer value of DTIM of its own wireless LAN access point; and a handover execution unit that stops communication to said wireless LAN clients at said adjusted timing independent of the wireless LAN clients, wherein the wireless LAN access point further comprises:

a storage that stores information relating to said other wireless LAN access points, wherein said handover timing adjuster judges whether or not the handover of the wireless LAN clients under control to said other wireless LAN access points is to be executed by collating with the information relating to said other wireless LAN access points stored in said storage.

8. The wireless LAN access point according to claim 7, wherein said handover execution unit stops communication including Beacon Management Frame.

9. The wireless LAN access point according to claim 7, wherein said handover information includes at least one of a table of the wireless LAN clients under control, and information buffered for transmission to said wireless LAN clients under control.

10. The wireless LAN access point according to claim 7, wherein said handover execution unit notifies a change of a communication channel to the wireless LAN clients under control.

11. The wireless LAN access point according to claim 10, wherein said handover execution unit notifies a change of the communication channel only to a specific wireless LAN client.

12. The wireless LAN access point according to claim 10, wherein said handover execution unit employs Channel Switch Announcement frame for changing the communication channel.

13. A wireless LAN access point comprising:

a handover timing adjuster that makes a response to a request for handover coming from other wireless LAN access points, judges whether or not said handover is to be executed independent of wireless LAN clients, and adjusts timing of the handover with said other wireless LAN access points independent of the wireless LAN clients when the handover is executed; and a handover execution unit that receives handover information necessary for accommodating the wireless LAN clients under control of said other wireless LAN access points from said other wireless LAN access points, and starts communication to said wireless LAN clients at said adjusted timing of the handover based upon said handover information, wherein said handover information includes a timer value of DTIM of the other wireless LAN access point, wherein the wireless LAN access point further comprises:

a storage that stores information relating to said other wireless LAN access points, wherein said handover timing adjuster judges whether or not the handover of the wireless LAN clients under control to said other wireless LAN access points is to be executed by collating with the information relating to said other wireless LAN access points stored in said storage.

14. The wireless LAN access point according to claim 13, wherein said handover execution unit starts communication including Beacon Management Frame.

15. The wireless LAN access point according to claim 13, wherein said handover information includes at least one of a table of the wireless LAN clients under control, and information buffered for transmission to said wireless LAN clients under control.

16. A handover execution method:
wherein a first wireless LAN access point detects a second wireless LAN access point independent of wireless LAN clients;
wherein said first wireless LAN access point:
judges whether or not a handover of the wireless LAN clients under control thereof to said second wireless access point is to be executed independent of the wireless LAN clients based upon information relating to said detected second wireless LAN access point;
transmits handover information necessary for accommodation of said wireless LAN clients under control of said first wireless LAN access point to said second wireless LAN access points independent of the wireless LAN clients, said accommodation being performed by said second wireless LAN access point, and adjusts timing of the handover with said second wireless LAN access point when the handover is executed, wherein said handover information includes a timer value of DTIM of said first wireless LAN access point; and
stops communication to said wireless LAN clients at said adjusted timing independent of the wireless LAN clients; and
wherein said second wireless LAN access point:
makes a response to a request for the handover coming from said first wireless LAN access point, and judges whether or not said handover is to be executed independent of the wireless LAN clients;
adjusts the timing of the handover with said first wireless LAN access point when the handover is executed independent of the wireless LAN clients; and
starts communication to said wireless LAN clients at the timing in which said handover is executed based upon said handover information, wherein said first wireless LAN access point comprises a storage that stores information relating to said second wireless LAN access point,
wherein said handover timing adjuster judges whether or not the handover of the wireless LAN clients under control to said second wireless LAN access points is to be executed by collating with the information relating to said second wireless LAN access points stored in said storage.

17. The handover execution method according to claim 16, wherein said first wireless LAN access point and said second wireless LAN access point stop or start communication including Beacon Management Frame.

18. The handover execution method according to claim 16, wherein said handover information includes at least one of a table of the wireless LAN clients under control, and information buffered for transmission to said wireless LAN clients under control.

19. The handover execution method according to claim 16:
wherein said first wireless LAN access point notifies a change of a communication channel to the wireless LAN clients under control thereof; and
wherein said second wireless LAN access point starts the communication to said wireless LAN clients through said communication channel.

20. The handover execution method according to claim 19, wherein said first wireless LAN access point notifies a change of the communication channel only to a specific wireless LAN client.

21. The handover execution method according to claim 19, wherein said first wireless LAN access point employs Channel Switch Announcement frame for changing the communication channel.

22. A non-transitory computer readable storage medium storing a program for a wireless LAN access point for causing an information processing device to execute:
a detection process of detecting other wireless LAN access points independent of wireless LAN clients;
a handover timing adjustment process of judging whether or not a handover of wireless LAN clients under control to said other wireless LAN access points is to be executed independent of the wireless LAN clients based upon information relating to said detected other wireless LAN access points, transmitting handover information necessary for accommodation of the wireless LAN clients under control of its own wireless LAN access point to said other wireless LAN access points independent of the wireless LAN clients, said accommodation being performed by said other wireless LAN access points, and adjusting timing of the handover with said other wireless LAN access points independent of the wireless LAN clients when the handover is executed, wherein said handover information includes a timer value of DTIM of its own wireless LAN access point; and
a handover execution process of stopping communication to said wireless LAN clients at said adjusted timing independent of the wireless LAN clients,
wherein the wireless LAN access point further comprises:
a storage that stores information relating to said other wireless LAN access points,
wherein said handover timing adjuster judges whether or not the handover of the wireless LAN clients under control to said other wireless LAN access points is to be executed by collating with the information relating to said other wireless LAN access points stored in said storage.

23. A non-transitory computer readable storage medium storing a program for a wireless LAN access point for causing an information processing device to execute:
a handover timing adjustment process of making a response to a request for handover coming from other wireless LAN access points, judging whether or not said handover is to be executed independent of wireless LAN clients, and adjusting timing of the handover with said other wireless LAN access points independent of the wireless LAN clients when the handover is executed; and
a handover execution process of receiving handover information necessary for accommodating the wireless LAN clients under control of said other wireless LAN access points from said other wireless LAN access points, and starting communication to said wireless LAN clients at said adjusted timing of the handover based upon said handover information, wherein said handover information includes a timer value of DTIM of the other wireless LAN access point,
wherein the wireless LAN access point further comprises:
a storage that stores information relating to said other wireless LAN access points,
wherein said handover timing adjuster judges whether or not the handover of the wireless LAN clients under control to said other wireless LAN access points is to be executed by collating with the information relating to said other wireless LAN access points stored in said storage.

* * * * *